Patented Apr. 23, 1946

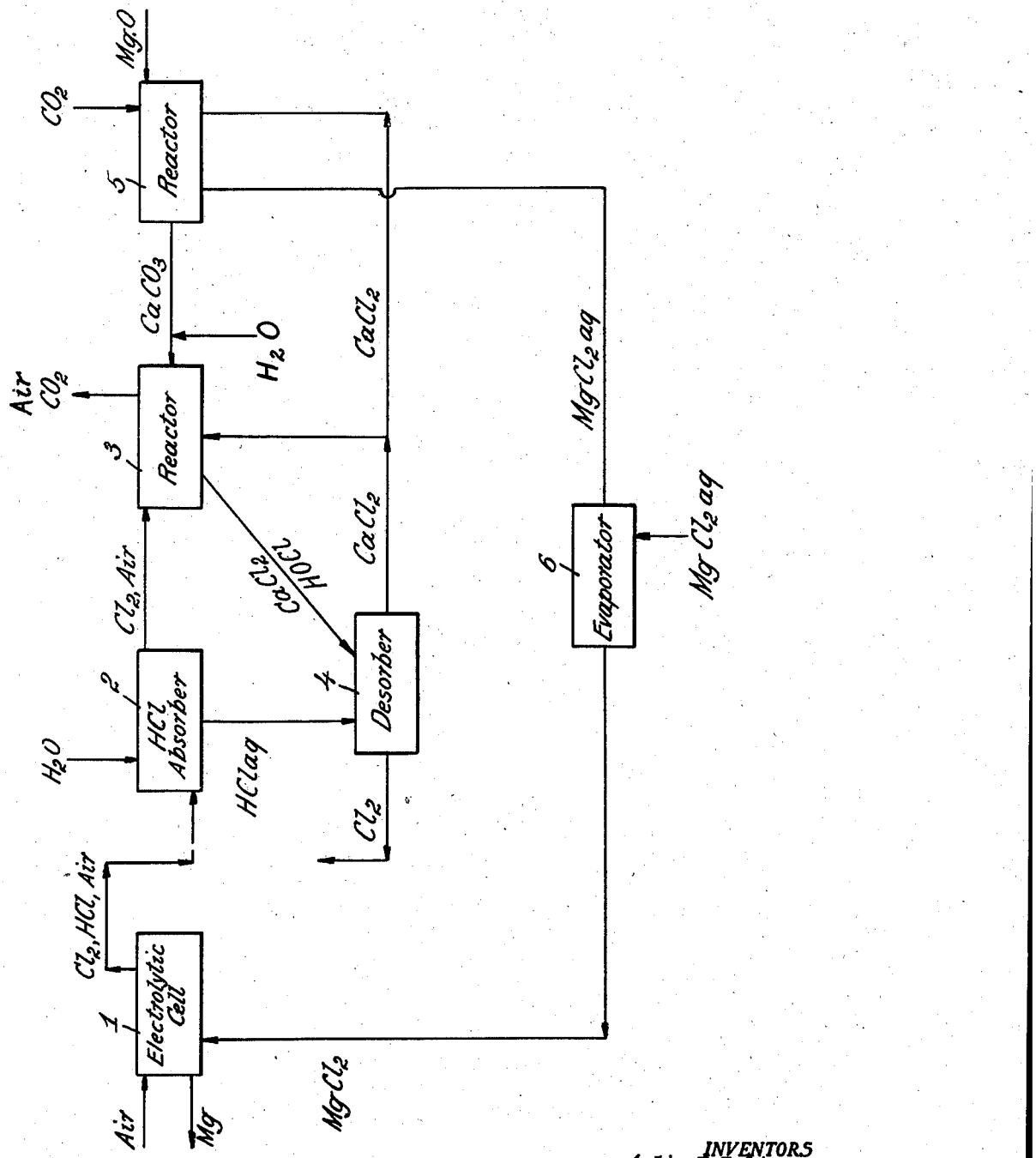

2,398,891

UNITED STATES PATENT OFFICE 2,398,891

RECOVERY OF CHLORINE FROM MAGNESIUM CHLORIDE ELECTROLYSIS

Arlie P. Julien and James K. Farrell, Syracuse, N. Y., assignors to The Solvay Process Company, New York, N. Y., a corporation of New York Application October 26, 1942, Serial No. 463,398

6 Claims. (Cl. 23—219)

This invention relates to improvements in the electrolytic process for producing magnesium metal from magnesium chloride, which improvements permit the recovery of chlorine from the dilute chlorine gases evolved during the electrolysis.

As is well known, both magnesium metal and chlorine are in great demand at the present time; as a result it has become increasingly important to recover chlorine from dilute gaseous mixtures containing it. Magnesium may be economically obtained by electrolyzing magnesium chloride; during the electrolysis a dilute chlorine mixture, containing, for example, from 3% to 6% chlorine by volume and varying amounts of hydrogen chloride, is evolved. However, the recovery of chlorine from this mixture has presented manifold difficulties so that the mixture has either been discarded to waste or the valuable chlorine product converted to hydrogen chloride; accordingly, the economic values in the dilute chlorine mixture evolved during this electrolysis have not been fully utilized.

It is an object of this invention to provide a process for the recovery of chlorine from dilute gaseous chlorine-hydrogen chloride mixtures produced during the electrolysis of magnesium chloride.

In accordance with this invention, chlorine is recovered from a dilute gaseous chlorine-hydrogen chloride mixture produced during the electrolysis of magnesium chloride by absorbing the hydrogen chloride in water, then contacting the residual gas with calcium or magnesium carbonate and water, preferably under conditions such that a reaction product comprising an aqueous solution of calcium or magnesium chloride and hypochlorous acid containing not more than 30 grams of hypochlorous acid per liter is produced, and treating the solution thus obtained with hydrochloric acid or sulfuric acid, whereby a substantially undiluted chlorine gas is evolved which may be used or recovered as desired.

Our invention is economical to operate and permits the recovery of substantially all of the chlorine gas present in the mixture evolved from the cell in substantially undiluted form, thus enhancing the economy of the over-all magnesium chloride electrolytic process as well as providing additional supplies of chlorine.

In carrying out the process of our invention the dilute chlorine-hydrogen chloride mixture, which may contain from about 3% to about 6% chlorine by volume and similar amounts of hydrogen chloride, is first contacted with water to absorb the hydrogen chloride in the form of hydrochloric acid. Contact of the mixture with the water is preferably effected at a temperature between about 0° and about 30° C. in order to achieve maximum absorption of the hydrogen chloride. If hydrogen chloride and chlorine are present in the gaseous mixture to be processed in approximately equimolecular amounts, as is frequently the case with the dilute chlorine-hydrogen chloride mixture recovered from the electrolysis of magnesium chloride, the amount of hydrochloric acid produced will be substantially equal to the amount required to liberate chlorine as hereinafter described, so that the acid thus produced may be advantageously employed for this purpose. If desired, however, additional hydrogen chloride may be incorporated in the system, either by direct addition of this substance or by conversion of an appropriate portion of the chlorine to hydrogen chloride by burning the gaseous mixture with hydrogen or a hydrocarbon gas, in order to permit the production of an amount of hydrochloric acid equal to that required to liberate the chlorine from the hypochlorous acid, produced as hereinafter described.

The dilute chlorine mixture which passes from the hydrogen chloride absorbing unit is then contacted with water and calcium or magnesium carbonate, preferably calcium carbonate, to convert the chlorine contained therein to calcium chloride and hypochlorous acid. The carbonate may be disposed in the form of lumps within a tower having an inlet for the chlorine mixture at the base thereof and a water inlet near the top so that the gas contacts the carbonate lumps while rising through the tower countercurrently to the flow of water; preferably, however, an aqueous suspension of finely divided calcium or magnesium carbonate is passed downwardly through a tower provided with suitable packing or trays countercurrently to the flow of chlorine gas, since the finely divided carbonates show greater reactivity with the chlorine than do massive lumps. An excess of carbonate over and above the amount required for the reaction should always be maintained at the top of the tower. The rate of flow of the dilute chlorine gas and water, or of chlorine gas and aqueous carbonate suspension, through the reaction zone should be so adjusted that the resulting chloride-hypochlorous acid solution contains not more than about 30 grams per liter of hypochlorous acid, since we have found that if the hypochlorous acid content of the solution produced is permitted to greatly exceed this value, appreciable losses of this acid, from which the chlorine is subsequently recovered, are incurred. The temperature at which this reaction is carried out may be between about 0° C. and about 35° C.

The aqueous chloride-hypochlorous acid solution produced as above described is then treated with hydrochloric or sulfuric acid in order to evolve a substantially undiluted chlorine gas. If the solution is treated with hydrochloric acid, the hydrochloric acid and hypochlorous acid interact to form chlorine and water, a substantially undiluted chlorine gas being thus evolved; the calcium or magnesium chloride remains unchanged. Treatment of the solution with sulfuric acid causes the sulfuric acid to react with the chloride present in the solution to form the corresponding sulfate and hydrochloric acid, which acid then reacts with the hypochlorous acid to form chlorine, which is evolved. The amount of acid employed may be approximately equivalent to that required to accomplish the desired reaction. The temperature at which this treatment is carried out may be between about 20° and about 50° C. when using hydrochloric acid and between about 25° and about 75° C. when using sulfuric acid. It is advantageous to employ reduced pressures such as about ⅓ atmosphere in order to accelerate the reaction by facilitating removal of chlorine gas from the reaction zone. The chlorine recovered may be used as such or dried by contact with sulfuric acid and then liquefied.

The calcium chloride solution remaining after liberation of the chlorine may be recycled through the zone in which reaction of the chlorine and carbonate occurs to build up the calcium chloride concentration to a point such that the calcium chloride may be economically used or recovered therefrom. When operating in this manner we have found it is important to avoid building up the calcium chloride concentration in the reaction zone above about 110 grams per liter, because higher concentrations of the chloride adversely affect the rate of reaction between the calcium carbonate and chlorine, resulting in less economical operation.

A specific embodiment of our invention is illustrated diagrammatically in the drawing. As shown in the figure magnesium chloride is electrolyzed in electrolytic cell 1, from which is withdrawn magnesium metal and a dilute chlorine-hydrogen chloride mixture, the chlorine and hydrogen chloride contents of which are substantially equal and are between about 3% and about 6% by volume, the balance of the mixture is principally air and water vapor. This mixture is passed to HCl absorber 2 wherein it is contacted with water at 20° C. in order to absorb the hydrogen chloride from the mixture and thereby form hydrochloric acid of about 15% concentration. The chlorine-air mixture passes from absorber 2 and is introduced into the base of reactor 3 at the rate of about 140 cubic feet per minute. Reactor 3 is preferably a packed tower, through which tower an aqueous suspension containing about 7.0 grams per liter of finely divided calcium carbonate is descending at the rate of about 70 liters per minute, the temperature of the reactants in the tower being about 20° C. In reactor 3 the chlorine reacts with the calcium carbonate and water to form an aqueous solution of calcium chloride and hypochlorous acid; under the conditions above specified a solution containing not more than 30 grams per liter of hypochlorous acid, e. g. about 7.5 grams per liter, is produced. Carbon dioxide generated by the reaction and air introduced with the chlorine are vented to the atmosphere.

The calcium chloride-hypochlorous acid solution is withdrawn from reactor 3 to desorber 4 wherein it is mixed with the hydrochloric acid produced in HCl absorber 2. The hydrochloric acid reacts with the hypochlorous acid to form chlorine which is withdrawn to a recovery zone (not shown). In the initial stages of the procedure the calcium chloride solution withdrawn from desorber 4 is returned to reactor 3 in order to build up the calcium chloride concentration in the solution withdrawn from desorber 4 to a point such that it may be economically used to react with magnesium oxide as hereinafter described; for this purpose the calcium chloride solution withdrawn from desorber 4 should preferably contain between about 90 and 100 grams of the chloride per liter. When the desired calcium chloride concentration has been attained, a portion of the solution only is returned to reactor 3 in order to maintain the desired concentration and the remainder is passed to reactor 5.

In reactor 5 the calcium chloride is reacted with carbon dioxide and magnesium oxide, which may be in the form of calcined dolomite or crude brucite, to produce calcium carbonate, which is returned to reactor 3, and a solution of magnesium chloride which is withdrawn to evaporator 6; in evaporator 6 water is removed, and the recovered magnesium chloride, usually containing water of hydration, then passed to electrolytic cell 1. Make-up magnesium chloride may, if desired, be introduced into evaporator 6.

In another embodiment of our invention, particularly applicable in locations where a supply of calcium chloride is available, for example in the form of waste liquors from ammonia-soda operations, the calcium chloride may be reacted with carbon dioxide and brucite or calcined dolomite to form calcium carbonate and magnesium chloride, which is then electrolyzed. The dilute chlorine-hydrogen chloride mixture evolved upon electrolysis of the magnesium chloride may then be contacted with water to absorb the hydrogen chloride as hereinabove described, the residual chlorine gas contacted with the calcium carbonate produced upon reaction of the calcium chloride with carbon dioxide and the brucite or calcined dolomite, and the further steps in the recovery of chlorine then carried out as described in connection with the specific embodiment illustrated in Figure 1. However, in the embodiment under consideration, due to the availability of large amounts of calcium chloride, it is not desirable to recycle the calcium chloride produced upon reaction of the chlorine and calcium carbonate, since we have found the chlorine-calcium carbonate reaction proceeds more readily in the absence of such recycled chloride.

Our invention may also find use in improving the economy of the process for recovering magnesium from sea water. As is known, in this operation the sea water is reacted with lime to precipitate magnesium hydroxide; the magnesium hydroxide thus formed is removed by filtration and converted to magnesium chloride for subsequent electrolysis. At present this conversion is accomplished by reaction with hydrochloric acid obtained by burning the chlorine in the gases evolved from the cells with hydrogen. In accordance with our invention, however, a portion or all of the magnesium hydroxide is converted to magnesium chloride by reaction with hydrochloric acid from external sources or by reaction with calcium chloride and carbon dioxide. All or a part of the dilute chlorine-hydrogen chloride gas evolved from the cells may then be treated as described in connection with Figure 1; the calcium carbonate necessary for reaction with the chlorine may advantageously be produced by reacting calcium chloride, produced, for example, during the chlorine-carbonate reaction, with a portion of the available magnesium hydroxide and with carbon dioxide, whereby the desired carbonate is obtained in conjunction with magnesium chloride. It will be evident, therefore, that this embodiment of our invention permits recovery for use or sale of all or a part of the valuable chlorine product.

While our invention is particularly applicable and useful in the recovery of chlorine from dilute chlorine-hydrogen chloride mixtures evolved during the electrolysis of magnesium chloride, it will be evident from the above description that it may also be applied to the recovery of chlorine from dilute gaseous mixtures containing this substance, or mixtures of this substance with hydrogen chloride, however produced, since the chlorine may be subjected to the reactions hereinabove described in substantially the same manner in order to recover concentrated chlorine gas. Thus, gases containing as little as 2.5% or less chlorine or as much as 50% chlorine may economically be processed. However, because of the well integrated procedures which our invention provides when applied to the recovery of chlorine from dilute gases produced in the electrolysis of magnesium chloride, our invention will find preeminent use in this latter field.

It will be evident from the above description that the process of our invention provides a simple and economical method for the recovery of chlorine from dilute chlorine mixtures, thus making possible the recovery of this valuable material from a great many mixtures which heretofore were passed to waste, as well as permitting the economical employment of processes for the manufacture of chlorine which up to the present time were uneconomical because dilute chlorine gases were obtained therefrom. Accordingly, the process of our invention will be of interest to those engaged in the manufacture of this valuable material.

Since certain changes may be made in carrying out the above process without departing from the scope of the invention, it is intended that all matter contained in the above description shall be interpreted as illustrative and not in a limiting sense.

We claim:

1. In the electrolytic process for the production of magnesium involving electrolysis of magnesium chloride to form magnesium metal and a dilute gaseous mixture containing chlorine and hydrogen chloride, the improvements which comprise generating the magnesium chloride for use in the electrolysis by reaction of calcium chloride with carbon dioxide and a substance selected from the group consisting of brucite and calcined dolomite, electrolyzing the magnesium chloride thus produced, withdrawing the dilute chlorine-hydrogen chloride mixture generated from the cell, absorbing the hydrogen chloride in water to form hydrochloric acid, contacting the residual gas with water and the calcium carbonate produced concurrently with the magnesium chloride used in the electrolysis, correlating the rates of flow of the aqueous and gaseous phases so that an aqueous calcium chloride-hypochlorous acid solution containing not more than 30 grams of hypochlorous acid per liter is produced, and treating the solution thus formed with hydrochloric acid so as to evolve a substantially undiluted chlorine gas.

2. A process for the recovery of chlorine from a gaseous mixture containing this substance which comprises contacting the mixture with water and a carbonate selected from the group consisting of calcium and magnesium carbonates, correlating the rates of flow of the aqueous and gaseous phases so that a reaction product is produced comprising an aqueous solution of a chloride selected from the group consisting of calcium and magnesium chlorides and hypochlorous acid in a concentration of not more than 30 grams of hypochlorous acid per liter, and treating the solution thus obtained with an acid selected from the group consisting of hydrochloric and sulfuric acids.

3. A process for the recovery of chlorine from a dilute gaseous chlorine mixture which comprises contacting the mixture with water and calcium carbonate, correlating the rates of flow of the aqueous and gaseous phases so that an aqueous calcium chloride-hypochlorous acid solution containing not more than 30 grams of hypochlorous acid per liter is produced, and treating the solution thus formed with hydrochloric acid to evolve a substantially undiluted chlorine gas.

4. A process for the recovery of chlorine from a dilute gaseous chlorine mixture which comprises introducing the mixture into the base of a packed tower through which an aqueous suspension of finely divided calcium carbonate is descending, the temperature within the tower being between about 0° and about 35° C., correlating the rates of flow of carbonate suspension and chlorine mixture through the tower so that an aqueous calcium chloride-hypochlorous acid solution containing not more than 30 grams of hypochlorous acid per liter is produced, treating the solution thus formed with hydrochloric acid at a temperature between about 20° and about 50° C., and recovering a substantially undiluted chlorine gas.

5. A process for the recovery of chlorine from a dilute gaseous chlorine-hydrogen chloride mixture which comprises absorbing the hydrogen chloride in water to form hydrochloric acid, introducing the remaining gas into the base of a packed tower through which an aqueous suspension of finely divided calcium carbonate is descending, the temperature within the tower being between about 0° and about 35° C., correlating the rates of flow of carbonate suspension and chlorine mixture through the tower so that an aqueous calcium chloride-hypochlorous acid solution containing not more than 30 grams of hypochlorous acid per liter is produced, treating the solution thus formed with hydrochloric acid at a temperature between about 20° and about 50° C., and recovering a substantially undiluted chlorine gas.

6. A process for the recovery of chlorine from a dilute gaseous chlorine-hydrogen chloride mixture produced in the electrolysis of magnesium chloride, which comprises contacting the gaseous mixture with water and calcium carbonate, correlating the rates of flow of the aqueous and gaseous phases so that an aqueous calcium chloride-hypochlorous acid solution containing not more than 30 grams of hypochlorous acid per liter is produced, and treating the solution thus formed with hydrochloric acid to evolve a substantially undiluted chlorine gas.

ARLIE P. JULIEN.
JAMES K. FARRELL.